United States Patent Office 3,741,798
Patented June 26, 1973

3,741,798
PROCESS FOR THE MANUFACTURE OF SOLUBLE ORGANIC COPOLYMERS AS WELL AS THEIR USE AS BINDERS COMPONENTS, ESPECIALLY IN PRIMERS AND TOP LACQUERS FOR GALVANIZED SHEET IRON
Horst Dalibor, Norderstedt, Germany, assignor to Reichhold-Albert-Chemie Aktiengesellschaft
No Drawing. Filed Dec. 16, 1970, Ser. No. 98,918
Claims priority, application Switzerland, Dec. 18, 1969, 18,826/69
Int. Cl. C08f 27/10, 15/40, 29/36
U.S. Cl. 117—132 B    3 Claims

ABSTRACT OF THE DISCLOSURE

The present invention concerns a method of a process for the manufacture of polyhydroxyl compounds in the form of soluble copolymers, containing hydroxyl groups, based on vinyl compounds and vinyl-aromatic compounds in inert solvents, in the presence of polymerization initiators and optionally of chain-stopping agents, characterized in that these are manufactured by heating, from (a) styrene or alkylstyrene, of which the alkyl groups possess 1 to 3 carbon atoms, or of a mixture of such alkyl groups,
(b) acrylic acid esters and/or methacrylic acid esters which contain 1 to 12 carbon atoms in the saturated alcohol radical,
(c) an $\alpha,\beta$-ethylenically unsaturated monocarboxylic acid or dicarboxylic acid and reaction, with esterification, with
(d) glycidyl esters of $\alpha$-alkylalkanemonocarboxylic acids and/or $\alpha,\alpha$-dialkylalkanemonocarboxylic acids of the following formula:
   $C_{12-14}H_{22-26}O_3$, with the amounts of the compounds (a) to (d) having to add up to 100% by weight. The invention includes also the use of the hydroxyl group containing copolymers being soluble in organic solvents together with polyisocyanates for the production of reactive lacquers for surface protection that can be unpigmented, pigmented and/or contain fillers.

BACKGROUND OF THE INVENTION

The object of the present invention is to provide a process for the manufacture of soluble organic copolymers as well as their use as binder components, but with the two-dimensional structures which can be manufactured therefrom exhibiting significantly improved properties in various directions. This includes the fact that the lacquer applied to a metallic substrate, and containing the new soluble organic copolymers in combination with organic polyisocyanates, is intended to cure after seven days' air drying at temperatures of about 20° C. to the extent that the film no longer swells under the action of water and can also not be removed mechanically by scratching, even if the film is briefly exposed to water at temperatures of 50-70° C. The copolymer of this invention is suitable, especially in combination with polyisocyanates, for the manufacture of primers and top lacquers, especially for galvanized sheet iron.

SUMMARY OF THE EMBODIMENT OF THE INVENTION

The present invention relates to a process for the manufacture of polyhydroxyl compounds in the form of soluble copolymers, containing hydroxyl groups, based on vinyl compounds and vinyl-aromatic compounds in inert solvents, in the presence of polymerization initiators and optionally of chain-stopping agents, characterized in that these are manufactured by heating from (a) 20–50% by weight of styrene or alkylstyrene, of which the alkyl groups possess 1 to 3 carbon atoms, or of a mixture of such alkyl groups,
(b) 10–40% by weight of acrylic acid esters and/or methacrylic acid esters which contain 1 to 12 carbon atoms in the saturated alcohol radical,
(c) 3–18% by weight of an $\alpha,\beta$-ethylenically unsaturated monocarboxylic acid or dicarboxylic acid and reaction, with esterification, with
(d) 10–50% by weight of glycidyl esters of $\alpha$-alkylalkanemonocarboxylic acids and/or $\alpha,\alpha$-dialkylalkanemonocarboxylic acids of the following overall formula: $C_{12-14}H_{22-26}O_3$, with the condition that the amounts of compounds (a) to (d) must add up to 100% by weight.

SUMMARY OF THE SPECIAL EMBODIMENT OF THE INVENTION

A special embodiment of the invention is characterized in that (a) 25–40% by weight of styrene or vinyltoluene,
(b) 15–35% by weight of acrylates and/or methacrylates or saturated monoalcohols with 1 to 8 carbon atoms,
(c) 7–12% by weight of acrylic acid or methacrylic acid, and
(d) 20–40% by weight of glycidyl esters of $\alpha$-alkylalkanemonocarboxylic acids and/or $\alpha,\alpha$-dialkylalkanemonocarboxylic acids of the following overall formula: $C_{12-14}H_{22-26}O_3$, with the amounts of the compounds (a) to (d) having to add up to 100% by weight, are reacted by heating.

SUMMARY OF THE PARTICULARLY PREFERRED EMBODIMENT OF THE INVENTION

A particularly preferred embodiment of the invention which is intended for reactive primers and top lacquers in combination with isocyanates, is characterized in that (a) 30–37.5% by weight of styrene,
(b) 20–30% by weight of n-butyl acrylate, n-butyl methacrylate or 2-ethylhexyl acrylate,
(c) 8–12% by weight of acrylic acid or methacrylic acid, and
(d) 30–36% by weight of glycidyl esters of $\alpha$-alkylalkanemonocarboxylic acids and/or $\alpha,\alpha$-dialkylalkanemonocarboxylic acid of the following overall formula: $C_{12-14}H_{22-26}O_3$, wherein the amounts of the compounds (a) to (d) must add up to 100% by weight, are reacted by heating.

SUMMARY OF THE INVENTION

Suitable solvents for the manufacture of the copolymers are those which do not contain any active hydrogen atoms, i.e. alkyl benzenes such as toluene or xylene, esters such as acetic acid ethyl ester and acetic acid n-butyl ester, and ether esters of diols such as methylglycol acetate or ethylglycol acetate.

Very suitable components (a) are styrene, followed by $\alpha$-, o-, m- and p-methylstyrene as well as halogenated styrenes. When copolymerized, they impart to the two-dimensional structures manufactured therewith a high resistance to saponification and good pigment uptake, if the copolymers are used as reactive lacquers together with organic polyisocyanates.

For the use of the copolymers in reactive lacquers it is absolutely essential that the content of styrene, $\alpha$-, o-, m- and p-methylstyrene and halogenated styrene, individually or as a mixture, is at least 20% by weight and at most 50% by weight relative to the solids content of the copolymer, and preferably 25 to 40% by weight. These amounts must be employed in order to impart to the lacquer gloss of the pigmented films, film hardeners, flexibility and anti-corrosive properties. At a lower content of styrene or alkyl-styrenes, the film hardness decreases. Furthermore, the chemical resistance and the anti-corrosive properties of the films obtained from the reactive lacquers declines.

Well-suited components (b) are generally methyl acrylate, ethyl acrylate, n-propyl acrylate, isopropyl acrylate, n-butyl acrylate, isobutyl acrylate, tert.-butyl acrylate, n-hexyl acrylate, n-octyl acrylate, 2-ethylhexyl acrylate, n-decyl acrylate and n-dodecyl acrylate. If esters of methacrylic acid, such as methyl methacrylate, n-butyl methacrylate or isobutyl methacrylate are conjointly used for copolymerization, the light stability of the lacquer coating, and the hardness can be favorably influenced, whilst when using the acryl esters with 4 to 8 carbon atoms in the saturated alcohol radical the elasticity and flexural strength is favorably influenced, and acrylates and/or methacrylates can be suited to special purposes by using appropriate mixtures.

The content of acrylic acid esters and/or methacrylic acid esters which contain 1 to 12 carbon atoms in the saturated alcohol radical, must only vary within the limits of 10–40% by weight—relative to the solids content of the solid—in the copolymer. The best film hardnesses, chemical resistances and anti-corrosive properties are achieved with the new copolymers, when used in the reactive lacquers, if the content of acrylic acid esters and/or methacrylic acid esters which contain 1 to 8 carbon atoms in the alcohol radical is 10–25% by weight relative to the solids content of the solid in the copolymer. On increasing the proportion of acrylate ester to above 25% by weight, the film elasticity and pigment uptake capacity increase.

Acrylic acid or methacrylic acid, maleic acid or fumaric acid, individually or as a mixture, are employed as component (c). Acrylic acid or methacrylic acid are preferred.

As components (d), glycidyl esters of α-alkylalkanemonocarboxylic acids and/or of α,α-dialkylalkanemonocarboxylic acids of the following overall formula: $C_{12-14}H_{22-26}O_3$, individually or as a mixture, are used. The $C_9$-$C_{11}$ acid contained in the glycidyl ester of the α-alkylalkanemonocarboxylic acids is based on the pioneering work of Dr. H. Koch of the Max-Planck Institute for Coal Research in Mühlheim, German Federal Republic. According to this work, the α-alkylalkane-acids mainly represent a mixture of $C_9$-, $C_{10}$- and $C_{11}$-monocarboxylic acids. The acids are completely saturated and are very heavily substituted at the carbon atom in the α-position. Acids with two hydrogen atoms on the α-carbon atom are not present, and only 6–7% of these acids contain a hydrogen atom. Furthermore, cyclic material is found.*

The glycidyl ester of α-alkylalkanemonocarboxylic acids and/or α,α-dialkylalkanemonocarboxylic acids following the overall formula $C_{12-14}H_{22-26}O_3$ as used for component (d) is produced by the firm Shell under the trade name of "Cardura E." This product can be described by the following formula

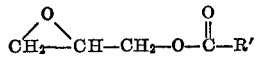

in which R' means an aliphatic hydrocarbon radical having 8 to 10 carbon atoms and a branched chain. This commercial product will be obtained by the reaction of epichlorhydrin with a mixture of saturated hydrocarbons, essentially tertiary carboxylic acids containing 9 to 11 carbon atoms, whereby this mixture of acids may still consist of 10% by weight of secondary carboxylic acids.

For the use of the copolymers according to the invention in reactive lacquers it is necessary for the content of the glycidyl esters of α-alkylalkanemonocarboxylic acids and/or α,α-dialkylalkanemonocarboxylic acids to be 20 to 40% by weight relative to the proportion of solids in the copolymer. On using 10 to 20% by weight of glycidyl esters of α-alkylalkanemonocarboxylic acids and/or α,α-dialkylalkanemonocarboxylic acids in the copolymer, the hydroxyl content is about 0.7 to 1.4% by weight. If such copolymers are employed in combination with the polyisocyanates, less cross-linking and hence greater elasticity of the reactive lacquers manifests itself. An increase in elasticity is thereby achieved, without increasing the content of acrylic acid esters to increase the elasticity.

The copolymers obtainable according to the process, when used in reactive lacquers, therefore still show very good anti-corrosive properties and good tests with water of condensation, but the film surface hardness has declined somewhat.

If 20 to 40% by weight, preferably 20 to 35% by weight, of glycidyl esters of α-alkylalkanemonocarboxylic acids and/or α,α-dialkylalkanemonocarboxylic acids, relative to the proportion of solids in the copolymer, are employed for the combination of polyisocyanates, the resulting reactive lacquers show higher crosslinking as a result of the increase in polyisocyanates, and hence an increase in the film surface hardness, and again good resistance of the films towards chemicals and water of condensation; however, the elasticity declines somewhat, but suffices if the lacquering is carried out on rigid substrates. If the lacquering is applied to extensible substrates, for example leather, the decrease in elasticity must be achieved by using 20 to 35% by weight of acrylic acid esters having an alcohol radical of 4 to 8 carbon atoms.

The reaction to manufacture the new copolymers takes place by the carboxyl groups of the component (c) reacting with the glycidyl groups of the α-alkylalkanemonocarboxylic acids and/or α,α-dialkylalkanemonocarboxylic acids of component (d) in such a way that a free hydroxyl group is produced, with the formation of an ester, this free hydroxyl group for example being necessary, in subsequent use, for the cross-linking of the organic polyisocyanates.

By polymerizing the monomer component (c) and condensing the component (d) with the copolymer the new copolymer will contain groups of the following formulas:

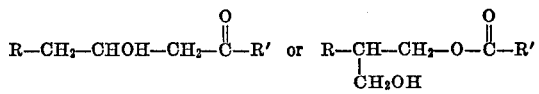

whereby R' has the above explained meaning and R stands for the radical of component (c). In these formulas the hydroxyl groups formed in the reaction can be clearly noticed. Equivalent amounts of carboxyl and glycidyl groups are brought to reaction. The copolymers made in this manner have acid numbers of 2 to 8, preferably such copolymers are made that have acid numbers of 4 to 8.

These new copolymers can be used as component A in reactive lacquers together with a polyisocyanate component B.

As component B, the following polyisocyanates can for example be employed:

toluylene-2,4-diisocyanate,
toluylene-2,6-diisocyanate,
cyclohexylene-1,4-diisocyanate,
diphenylmethane-4,4'-diisocyanate,
naphthylene-1,5-diisocyanate,
4,4',4''-triphenylmethanetriisocyanate, (the above polyisocyanates are used preferably because they show a good reaction time with hydroxyl groups and they permit the procedure of this invention to be carried thru in a commercially profitable manner), 1-(isocyanatophenyl)-ethylisocyanate or the xylylenediisocyanate (these both diisocyanates are preferred if the coatings made according to the invention should not turn yellow), fluorine substituted diisocyanates, ethylene glycol-diphenyl-ether-2,2'-diisocyanate, diethylene glycol-

---

*Deutsche Farben Zeitschrift, issue 10/16th year, page 435.

diphenyl-ether-2,2'-diisocyanate (the last named three diisocyanates are preferred if especially flexible coats are to be made),
1,1'-dinaphthyl-2,2'-diisocyanate,
biphenyl-2,4'-diisocyanate,
biphenyl-4,4'-diisocyanate,
benzophenone-3,3'-diisocyanate,
fluorene-2,7-diisocyanate,
anthraquinone-2,6-diisocyanate,
pyrene-3,8-diisocyanate,
chrysene-2,8-diisocyanate,
1-methylbenzene-2,4,6-triisocyanate,
naphthalene-1,3,7-triisocyanate,
biphenyl-methane-2,4,4'-triisocyanate,
triphenylmethane-4,4',4''-triisocyanate (the above named polyisocyanates are chosen if the hardness of the coats to be made should be raised), 3'-methoxyhexane-diisocyanate+,
octane-ω,ω-diisocyanato-1,4-diethylbenzene,
ω,ω-diisocyanato-1,4-dimethylnaphthalene,
cyclohexane-1,2-diisocyanate+,
1-isopropylbenzene-2,4-diisocyanate+

(those of the above polyisocyanates marked by a + produce coats that do not turn yellow), 1-chlorobenzene-2,4-diisocyanate,
1-fluorobenzene-2,4-diisocyanate,
1-nitrobenzene-2,4-diisocyanate,
1-chloro-4-methoxybenzene-2,5-diisocyanate,
azobenzene-4,4'-diisocyanate,
benzene-azo-naphthalene-4,4'-diisocyanate,
diphenyl-ether-2,4-diisocyanate, and
diphenyl-ether-4,4'-diisocyanate.

Instead of the polyisocyanates, it is also possible to use compounds which split off polyisocyanates, and also reaction products, containing isocyanate groups, of polyhydric alcohols with polyisocyanates, for example the reaction product of 1 mol of trimethylolpropane with 3 mols of toluylene-diisocyanate. This is particularly suitable for primers and such top lacquers which are not mixed with white pigments. Further, trimerized or polymerized isocyanates, such as are, say described in German patent specification 951,168, are suitable.

Further, it is also possible to use a reaction product of 1 mol of water and 3 mols of hexamethylene-diisocyanate with an NCO-content of 16-17% by weight. The last-mentioned reaction product of water and hexamethylenediisocyanate is particularly preferred for top lacquerings. The NCO-content of the reaction product applies to a 75% by weight solution in xylene/ethylglycol acetate. The new copolymers are manufactured by solvent polymerization with the monomers (a) to (c) and the glycidyl ester (d), together with the solvents and the initiators, and possibly also in the presence of chain stoppers, being reacted in the reaction kettle, in the course of which the condensation reaction and the polymerization reaction take place conjointly. A preferred embodiment is to dissolve the glycidyl ester in the solvent, to add the monomers (a) to (c), together with the initiators and chain stoppers, at an elevated temperature—say 80 to 170° C.—and to condense and polymerize conjointly.

As initiators, the following should for example be mentioned: azo compounds and peroxide compounds, for example benzoyl peroxide, cumene hydroperoxide or di-tert.-butyl peroxide. It is possible to adapt the degree of polymerization, and hence to meet the particular requirements, by the conjoint use of chain stoppers such as mercaptans and aldehydes.

Viscosities for 50% by weight resin concentrations in aromatic solvents, such as for example toluene or xylene, or in ether-esters, such as for example ethylglycol acetate, of K–$Z_4$ on the Gardner-Holdt scale are aimed at. The viscosity range of U to $Z_2$ at 20° C. is preferred.

USE OF THE NEW COPOLYMERS

The new polymers should preferably possess molecular weights of about 5000-20,000. These should have a hydroxyl group content of 0.7 to 3.0, preferably 1.5 to 2.8% by weight. The hydroxyl group content relates to the solids content in the copolymer.

The reaction of the copolymers A, containing hydroxyl groups, when used in reactive lacquers with the organic polyisocyanates B can at the same time, depending on the end use of the reaction products, be carried out with 0.5 to 1.3 NCO groups total hydroxyl groups. The reaction is preferably carried out by the amounts of the organic polyisocyanate, relative to the total hydroxyl content of the components present in the reaction mixture, being such as to give an amount of 0.7 to 1.1 isocyanate groups per hydroxyl group.

In order to use the new copolymers, the mixtures of copolymers A, containing solvent and containing hydroxyl groups, and polyisocyanate B are applied to the appropriate substrates in the simplest conceivable manner, say by spraying, dipping, casting, brushing or other suitable measures, possible after addition of known auxiliary agents, such as levelling agents, pigments or dyestuffs, and the two-dimentional structures are dried at room temperatures; in special cases, say when using compounds which split off isocyanate, the coatings can be stoved, this depending essentially on the substrates used and on the demands made of the coatings in practice.

The conjoint use of reactive melamine resins can also be advantageous. The reactive melamine resins can be added in amounts of, say, 1 to 10% by weight, whereby, in particular, an increase in gloss in the two-dimensional structure can be observed.

Monomethyl - pentamethoxymethylenemelamine, dimethyloltetramethoxymethylenemelamine or trimethyloltrimethoxymethylenemelamine, individually or as a mixture, can be used as reactive melamine resins.

When using the new copolymers in the reactive lacquers already explained, the reaction and the application of the two-dimensional structures to the substrate take place in solution. Suitable solvents are, for example, acetic acid ethyl ester, acetic acid n-butyl ester, ether-esters, diethylglycol-diacetate, as well as aromatic compounds, such as benzene, toluene or xylene. The concentration of the solutions can vary within wide limits and depends essentially on the solubility of the components. Solutions with a solids content of 20-80% by weight are preferably used.

However, polymer solutions with a low hydroxyl group content, which leads to weaker crosslinking are also of interest for special end uses, for example for coatings on movable substrates. Such copolymers are miscible in all ratios with the polyesters, containing hydroxyl groups, and other polyethers, which are typical in practice, and can therefore be extended with these. The reaction products of such extended mixtures with polyisocyanates also yield corrosion resistant coatings with similar properties to those already described above, with the relatively rapid drying time being in particular noticeable.

The copolymers obtainable according to the process can be employed for the manufacture of coverings or coatings, together with polyisocyanates in the reactive lacquers already explained, on substrates of the most diverse nature, for example porous or nonporous substrates, such as textile fleeces, leather or plastics. The manufacture of coatings on timber or metals should be particularly highlighted. In each case, highly glossy, pore-free, elastic and solvent-resistant coatings of very high surface hardness are obtained. Such coatings furthermore show excellent resistance to weathering and to yellowing.

It should be particularly highlighted that the coatings or coverings on galvanized iron sheets, zinc and aluminum sheets, manufactured in this way, display excellent adhesion when used as single-layer lacquerings. The coverings and coatings can advantageously be applied to aluminum or zinc by applying the coatings, and then freeing the coating of the solvent by a temperature treatment lasting about 30 minutes at 40–50° C., after which the covering or coating is present in a non-tacky state, so that the surface does not pick up any dust and is also no longer sensitive to impact or other mechanical pressure, so that the articles lacquered in this way can be subjected to further processing. After curing for seven days at room temperature, maximum properties are then achieved. The maximum properties are also achieved if the temperature is raised to 120° C. in 30 minutes.

When using the new copolymers in reactive lacquers, the components A and B are preferably employed in the following amounts:

(A) 65–90% by weight of copolymers, containing hydroxyl groups, manufactured from:
  (a) 20–50% by weight of styrene or alkylstyrene, of which the alkyl groups possess 1 to 3 carbon atoms, or of a mixture of such alkyl groups,
  (b) 10–40% by weight of acrylic acid esters and/or methacrylic acid esters, which contain 1 to 12 carbon atoms in the saturated alcohol radical,
  (c) 3–18% by weight of an $\alpha,\beta$-ethylenically unsaturated monocarboxylic acid or dicarboxylic acid, and reaction, with esterification, with
  (d) 10–50% by weight of glycidyl esters of $\alpha$-alkylalkanemonocarboxylic acids and/or $\alpha,\alpha$-dialkylalkanemonocarboxylic acids of the following overall formula $C_{12-14}H_{22-26}O_3$, with the amounts of the compounds (a) to (d) having to add up to 100% by weight, and
(B) 10–35% by weight of organic polyisocyanate, with A and B together having to give figures of 100% by weight.

A special embodiment of the use comprises:

(A) 65–90% by weight of copolymers, containing hydroxyl groups, manufactured from:
  (a) 25–40% by weight of styrene or vinyltoluene,
  (b) 15–35% by weight of acrylates and/or methacrylates of saturated monoalcohols with 1 to 8 carbon atoms,
  (c) 7–12% by weight of acrylic acid or methacrylic acid,
  (d) 20–40% by weight of glycidyl esters of $\alpha$-alkylalkanemonocarboxylic acids and/or $\alpha,\alpha$-dialkylalkanemonocarboxylic acids of the following overall formula: $C_{12-14}H_{22-26}O_3$, with the amounts of the compounds (a) to (d) having to add up to 100% by weight, and
(B) 10–35% by weight of organic polyisocyanates, with A and B together having to give figures of 100% by weight.

A particularly preferred embodiment comprises the use of copolymers in combination with polyisocyanates, for primers and top lacquers, with the combination consisting of:

(A) 70–74.5% by weight of copolymers, containing hydroxyl groups, manufactured from:
  (a) 30–37.5% by weight of styrene,
  (b) 20–30% by weight of n-butyl acrylate, n-butyl methacrylate or 2-ethylhexyl acrylate,
  (c) 8–12% by weight of acrylic acid or methacrylic acid,
  (d) 30–36% by weight of glycidyl esters of $\alpha$-alkylalkanemonocarboxylic acids and/or $\alpha,\alpha$-dialkylalkanemonocarboxylic acids of the following overall formula: $C_{12-14}H_{22-26}O_3$, with the amounts of the compounds (a) to (d) having to add up to 100% by weight, and
(B) 25.5–30% by weight of organic triisocyanate which was obtained by reaction of 3 mols of toluylenediisocyanate and 1 mol of trimethylolpropane, with A and B having to give figures of 100% by weight.

A particularly preferred embodiment of the invention comprises copolymers in combination with polyisocyanates for top lacquers, with the combination consisting of:

(A) 75–80% by weight of copolymers, containing hydroxyl groups, manufactured from:
  (a) 30–37.5% by weight of styrene,
  (b) 20–30% by weight of n-butyl acrylate, n-butyl methacrylate or 2-ethylhexyl acrylate,
  (c) 8–12% by weight of acrylic acid or methacrylic acid,
  (d) 30–36% by weight of glycidyl esters of $\alpha$-alkylalkanemonocarboxylic acids, and/or $\alpha,\alpha$-dialkylalkanemonocarboxylic acid of the following overall formula: $C_{12-14}H_{22-26}O_3$, with the amounts of the compounds (a) to (d) having to add up to 100% by weight, and
(B) 20–25% by weight of organic triisocyanate which was obtained by reaction of 3 mols of hexamethylenediisocyanate and 1 mol of water, with A and B having to give figures of 100% by weight.

EXAMPLE 1

Manufacture of the copolymer 1

528 g. of xylene and 268 g. of glycidyl ester of $\alpha,\alpha$-dialkylalkanemonocarboxylic acids of the following overall formula: $C_{12-14}H_{22-26}O_3$, with an epoxy equivalent of 240–250, hereafter merely described as glycidyl esters of $\alpha,\alpha$-dialkylalkanemonocarboxylic acids, are heated to 125° C. in a flask equipped with a stirrer, reflux condenser and thermometer, and a mixture consisting of 250 g. of styrene, 80 g. of acrylic acid, 202 g. of n-butyl acrylate, 3 g. of n-dodecylmercaptan and 8 g. of di-tert.-butyl peroxide is uniformly added over the course of two hours, and polymerization and condensation are carried out for about 8 to 10 hours of this temperature.

The solids content is 60.2% by weight. The viscosity measured according to Gardner-Holdt in xylene at 20° C. amounts to Y. The acid number reaches a value of 7.2. The product has a hydroxyl number of 85.

EXAMPLE 2

Manufacture of copolymer 2

528 g. of xylene and 265 g. of glycidyl ester of $\alpha,\alpha$-dialkylalkanemonocarboxylic acids are heated to 125° C. in the same manner as that described for the manufacture of the copolymer 1, and the following mixture, consisting of 295 g. of styrene, 78 g. of acrylic acid, 162 g. of n-butyl acrylate, 8 g. of di-tert.-butyl peroxide and 6 g. of n-dodecylmercaptan is uniformly added over the course of two hours, and the mixture conjointly polymerized and condensed for about 9 to 11 hours whilst heating to about 125° C. The solids content is 60.4% by weight. The viscosity, measured according to Gardner-Holdt in xylene, is X. The acid number attains a value of 7. The copolymer has a hydroxyl number of 80.

EXAMPLE 3

Reactive lacquer based on 74% by weight of copolymer and 26.0% by weight of organic triisocyanate, both relative to the weight of solids.

133 g. of copolymer 1 are ground with 75 g. of titanium dioxide (Rutile), 15 g. of zinc chromate, 15 g. of talc, 45 g. of barium sulphate and 1 g. of calcium naphthenate to give a lacquer, and 38.8 g. of 67% by weight solution of a triisocyanate, with an NCO content of 11.5% by weight are dissolved in a 1:1 by volume mixture of xylene-ethylglycol acetate, whereby the triisocyanate has been obtained by reaction of 3 mols of toluylenediisocyanate and one mol of trimethylolpropane, are added, and the whole is diluted with a 1:1 by volume mixture of xylene/ethylglycol acetate, applied by spraying onto freshly galvanized iron sheets, and dried for seven days in air at room temperature. The primer was tested by the water of condensation test at 40° C. and 90% relative atmospheric humidity (1 cycle=8 hours at 40° C. and 16 hours at room temperature). Result: after 30 cycles no swelling, no blister formation. Cross-cut according to DIN 53151=1.

EXAMPLE 4

Reactive lacquer based on 74% by weight of this copolymer and 26% by weight of organic triisocyante, both relative to the weight of solids.

123 g. of the copolymer 1 are ground with 75 g. of titanuim dioxide (Rutile), 15 g. of zinc chromate, 15 g. of talc, 45 g. of barium sulphate and 1 g. of calcium naphthenate to give a lacquer, 38.8 g. of a 67% by weight solution of a triisocyanate from Example 1 are added, and after dilution to the spraying viscosity with a mixture consisting of xylene/ethylglycol acetate, 1:1 by volume the whole is applied to galvanized iron sheets at a dry film layer thickness of 40μ and dried for seven days in air. The priming was tested in the water of condensation test as described in Example 1. Result: after 30 cycles the priming showed no swelling and no blister formation. Erichsen deep-drawing value after exposure to load: 5 mm.

EXAMPLE 5

Reactive lacquer based on 79% by weight of copolymer and 21% by weight of organic triisocyanate, both relative to the weight of solids.

534 g. of the copolymer 2 solution are ground with 600 g. of titanium dioxide (Rutile), 200 g. of xylene and 100 g. of ethylglycol acetate to give a lacquer.

150 g. of the pigmented copolymer 2, 65 g. of the unpigmented copolymer 2 and 25.8 g. of a 75% by weight solution of a triisocyanate with an NCO-content at 16.5–17.0% by weight are dissolved in a 1:1 by volume mixture of xylene and ethylglycol acetate, whereby the triisocyanate was obtained by reaction of 3 mols of hexamethylenediisocyanate and 1 mol of water. Then it is diluted with xylene to the spraying viscosity, in order to obtain a coat lacquer.

First fire-galvanized iron sheets were given a primer according to Example 1 of this invention the dried coat having a thickness of about 35 to 40μ. After a drying time of 24 hours at room temperature the coat lacquer was sprayed onto it according to Example 5, so that the dried film of the coat lacquer showed the thickness of layer of about 40μ.

After a drying time of seven days at room temperature (20° C.) the lacquer was subjected to several tests.

Water of corrosion test

The sheets were put in a test apparatus having a closed chamber. At the bottom of this chamber there was an open trough containing water of 40° C. The relative air humidity was brought up to 90%. After 240 hours of testing time the grate cut made according to DIN 53151 showed a value of 1. The grate cut had a value of 0 before the placing into the test chamber. This test result shows that the coats made according to the invention have outstanding properties concerning the adhesion and elasticity. If a copolymer is used instead that is being produced in a modified manner of Example 2 but by using 457 g. of styrene and 78 g. of acrylic acid and 265 g. of glycidyl ester of α,α-dialkylalkanemonocarboxylic acids and if it is worked as described in Examples 4 and 5 as primer and coat lacquer chipping off of the complete lacquer coating will be noticed already after 100 hours when the same test is employed.

Impact resistance test made with test pieces from the water of corrosion test

The test pieces from the water of corrosion test are subjected to an impact resistance test. After the performing of the single impacts the deformed surface is tested for defects of the lacquering. Using an adjusted value of 40-inch-pound no crack growth was recognized.

This test result shows extraordinary values for the lacquer coatings in regard to bond strength, elasticity and anticorrosive properties.

What is claimed is:

1. A method of coating galvanized iron sheets, zinc and aluminum sheets by applying solution of a mixture of 70–80% by weight of hydroxyl group containing copolymer and 20–30% by weight of organic polyisocyanates to the metal substrate as single-layer lacquering, freeing the lacquering of solvent by a temperature treatment lasting about 30 minutes at 40° C. to 50° C. and curing the lacquering at a temperature in the range of room temperature to 120° C., wherein the hydroxyl group containing copolymer comprises the reaction product of:
 (a) 30–37.5% by weight of styrene,
 (b) 20–30% by weight of n-butyl acrylate, n-butyl methacrylate or 2-ethylhexyl acrylate,
 (c) 8–12% by weight of acrylic acid or methacrylic acid,
 (d) 30–36% by weight of glycidyl esters of α-alkyl-alkanemonocarboxylic acids, α,α-dialkylalkanemonocarboxylic acid of the overall formula:

$$C_{12-14}H_{22-26}O_3,$$

or mixtures thereof, with the amounts of the compounds (a) to (d) having to add up to 100% by weight, and the copolymer possesses a molecular weight between 5,000 and 20,000 and has a hydroxyl group content of 1.5 to 2.8% by weight relative to the solids content.

2. Process according to claim 1 wherein the copolymer is being used in such amounts that the reaction of the copolymer containing hydroxyl groups with the organic polyisocyanate is carried out with 0.7 to 1.1 NCO group per hydroxyl group.

3. Process according to claim 1 wherein 1 to 10% by weight of reactive melamine resins are conjointly used.

References Cited

UNITED STATES PATENTS 3,330,814    7/1967    Vasta _____ 260—851
3,375,227    3/1968    Hicks _____ 260—856
3,544,505    12/1970    Nagata et al. _____ 260—851

JOHN C. BLEUTGE, Primary Examiner

U.S. Cl. X.R.

117—71 M, 75; 260—77.5 AP, 80.75, 80.8, 80.81, 88.1 PC, 851, 856